(12) United States Patent
Kuwayama (10) Patent No.: US 10,048,171 B2
(45) Date of Patent: Aug. 14, 2018

(54) METHOD AND APPARATUS FOR MEASURING TIRE GROUND CONTACT PROPERTIES

(71) Applicant: BRIDGESTONE CORPORATION, Chuo-ku, Tokyo (JP)

(72) Inventor: Isao Kuwayama, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 317 days.

(21) Appl. No.: 14/415,417

(22) PCT Filed: Jul. 3, 2013

(86) PCT No.: PCT/JP2013/004132
§ 371 (c)(1),
(2) Date: Jan. 16, 2015

(87) PCT Pub. No.: WO2014/013688
PCT Pub. Date: Jan. 23, 2014

(65) Prior Publication Data
US 2015/0135812 A1  May 21, 2015

(30) Foreign Application Priority Data
Jul. 20, 2012  (JP) .................................. 2012-161872

(51) Int. Cl.
*G01M 17/02* (2006.01)
(52) U.S. Cl.
CPC .................................. *G01M 17/022* (2013.01)
(58) Field of Classification Search
CPC . G01M 17/022; G01M 17/02; B60C 23/0408; B60C 5/30; G01B 7/16; A61B 19/464
(Continued)

(56) References Cited

U.S. PATENT DOCUMENTS 3,661,014 A * 5/1972 Ciampolini ......... G01M 17/022
                                                73/146
3,861,208 A * 1/1975 Lippmann ........... G01M 17/022
                                                73/146
(Continued)

FOREIGN PATENT DOCUMENTS

CN    102398487 A    4/2012
CN    102435450 A    5/2012
(Continued)

OTHER PUBLICATIONS

Chen, Normal distribution, Dec. 2008, Department of Mathematics National Taiwan University, pp. 1-2.*
(Continued)

*Primary Examiner* — John Fitzgerald
*Assistant Examiner* — Truong D Phan
(74) *Attorney, Agent, or Firm* — Sughrue Mion, PLLC (57) ABSTRACT

A tire (T) for measurement, having applied thereto a required camber angle (CA) and slip angle (SA), is contacted against a rotatably driven rotating drum (1) having embedded therein a three-component force sensor (measurement unit 3) capable of measuring ground contact pressure (P), width direction shear stress ($\tau_x$), and circumferential shear stress ($\tau_y$) (properties) of the tire (T). The rotating drum (1) and tire (T) are rotated and the tire (T) is passed over the three-component force sensor (3) multiple times. The tire (T) properties are measured multiple times, and the tire circumferential direction position of each measurement point is identified. A ground contact pressure distribution, width direction shear stress distribution, and circumferential shear stress distribution in a contact region of the tire (T) with the rotating drum (1) are obtained by repeating measurement and identification while displacing the tire (T) along the rotation axis of the rotating drum (1).

4 Claims, 8 Drawing Sheets

(58) Field of Classification Search
USPC .................................................. 73/146, 760
See application file for complete search history.

(56) References Cited

U.S. PATENT DOCUMENTS

| | | | | |
|---|---|---|---|---|
| 3,914,907 | A * | 10/1975 | Hofelt, Jr. | B24B 5/366 451/1 |
| 4,160,378 | A * | 7/1979 | Himmler | G01M 17/022 73/146 |
| 4,545,239 | A * | 10/1985 | Himmler | G01M 17/022 73/146 |
| 4,702,103 | A * | 10/1987 | Wenz | G01M 17/02 73/146 |
| 4,956,995 | A * | 9/1990 | Harrold | G01M 17/022 73/146 |
| 5,060,173 | A * | 10/1991 | Tsuji | G01N 19/08 702/35 |
| 5,641,900 | A * | 6/1997 | Di Bernardo | G01L 17/005 73/146 |
| 5,944,863 | A * | 8/1999 | Scott | C03B 3/00 65/129 |
| 6,435,043 | B1 * | 8/2002 | Ferguson | G01N 1/2208 73/863.22 |
| 2003/0061719 | A1 * | 4/2003 | Gerdes | G01N 1/045 33/203.13 |
| 2003/0196483 | A1 * | 10/2003 | Beebe | G01M 17/022 73/146 |
| 2004/0255661 | A1 * | 12/2004 | Nagai | G01M 17/022 73/146 |
| 2005/0072236 | A1 * | 4/2005 | Heyman | G01N 29/07 73/602 |
| 2005/0159874 | A1 * | 7/2005 | Bertrand | B60T 8/172 701/80 |
| 2006/0123897 | A1 * | 6/2006 | Monguzzi | B60C 23/00 73/146 |
| 2007/0023122 | A1 * | 2/2007 | Moriguchi | G01M 17/02 156/64 |
| 2009/0038380 | A1 * | 2/2009 | Elwell | G01N 33/6848 73/61.42 |
| 2012/0048006 | A1 * | 3/2012 | Koguchi | G01L 17/005 73/146 |
| 2013/0205883 | A1 * | 8/2013 | Symens | G01M 17/022 73/146 |

FOREIGN PATENT DOCUMENTS

| | | |
|---|---|---|
| DE | 19704605 C1 | 6/1998 |
| JP | 02-296127 A | 12/1990 |
| JP | 09-26382 A | 1/1997 |
| JP | 2006-226778 A | 8/2006 |
| JP | 2011-203207 A | 10/2011 |
| JP | 2011203207 A | 10/2011 |

OTHER PUBLICATIONS

Series 260/261 3-Component Dynamic Force Sensors, 2009, PCB piezotronics, pp. 1-4.*
International Search Report for PCT/JP2013/004132 dated Aug. 20, 2013.
Communication dated Sep. 15, 2015 from the Japanese Patent Office issued in corresponding Japanese application No. 2012-161872.

* cited by examiner

METHOD AND APPARATUS FOR MEASURING TIRE GROUND CONTACT PROPERTIES

CROSS REFERENCE TO RELATED APPLICATIONS

This application is a National Stage of International Application No. PCT/JP2013/004132 filed Jul. 3, 2013, claiming priority based on Japanese Patent Application No. 2012-161872, filed Jul. 20, 2012, the contents of all of which are incorporated herein by reference in their entirety.

TECHNICAL FIELD

The present invention relates to a method and apparatus for measuring tire ground contact properties by measuring the ground contact properties of a rolling tire.

BACKGROUND ART

PTL 1, for example, illustrates a known method and apparatus for measuring the ground contact properties of a rolling tire. In PTL 1, a tire is contacted against a flat tire ground contact stand in which a measurement device is embedded, and by displacing the tire ground contact stand horizontally with a drive unit, the ground contact properties of the tire rolling on the measurement device are measured.

The above method and apparatus, however, have the problem that the tire ground contact properties when driving at high speed cannot be reproduced, since it is difficult to displace the tire ground contact stand horizontally at a high speed.

To address this problem, a measurement method and apparatus have been proposed, for example as in PTL 2, to contact a tire against the outer circumference of a rotating drum in which a measurement unit is embedded. Rotating the rotating drum and the tire together allows for measurement while rolling the tire at high speed, thereby easily allowing for measurement of the tire ground contact properties when driving at high speed.

CITATION LIST

Patent Literature

PTL 1: JP H09-26382 A
PTL 2: JP 2011-203207 A

SUMMARY OF INVENTION

Technical Problem

In the conventional method and apparatus disclosed in PTL 2, a three-component force sensor is used as the measurement unit, and by rotating the rotating drum and the tire together, measurements are made while displacing the tire gradually along the axis of rotation. Therefore, the ground contact pressure distribution, width direction shear stress distribution, and circumferential shear stress distribution across the entire ground contact region of the tire can be measured easily and in detail.

In the measurement method and apparatus in PTL 2, however, at the time of measurement the measurement unit randomly contacts positions, in the circumferential direction, on the tread pattern of the tire. Therefore, the results of multiple measurements by the measurement unit are averaged in the tire circumferential direction to yield a three-component force distribution in the tire ground contact region as average ground contact behavior. Therefore, detailed assessment of the ground contact properties at each location on the tire tread pattern has not been possible, and there is a demand for a method and apparatus for measuring tire ground contact properties in greater detail.

The present invention has been conceived in light of the above problems and provides a method and apparatus for measuring tire ground contact properties that yield the ground contact properties at each position on the tire tread surface in detail.

Solution to Problem

The main features of the present invention for resolving the above problems are as follows.

A method for measuring tire ground contact properties of the present invention is a method for measuring ground contact properties of a rolling tire, comprising the steps of: rotating a rotating drum capable of being rotatably driven and a tire together, the rotating drum having embedded therein a measurement unit capable of measuring ground contact pressure, width direction shear stress, and circumferential shear stress of the tire, the tire being contacted against the rotating drum as a target of measurement; contacting the measurement unit to a plurality of locations in a tire circumferential direction on a tread surface of the tire, the locations passing over the measurement unit; measuring the ground contact pressure, the width direction shear stress, and the circumferential shear stress of the tire at the locations; identifying a position in the tire circumferential direction of each measurement point; and obtaining a ground contact pressure distribution, a width direction shear stress distribution, and a circumferential shear stress distribution in a contact region of the tire with the rotating drum by repeating the steps of measuring and identifying while relatively displacing the tire along an axis of rotation of the rotating drum.

In the method for measuring tire ground contact properties of the present invention, the measurement unit is preferably a three-component force sensor capable of measuring the ground contact pressure, the width direction shear stress, and the circumferential shear stress of the tire.

An apparatus for measuring tire ground contact properties of the present invention is an apparatus for measuring ground contact properties of a rolling tire, comprising: a drum drive unit configured to control a rotating drum and a rotational velocity of the rotating drum, the rotating drum having embedded therein a measurement unit capable of measuring ground contact pressure, width direction shear stress, and circumferential shear stress of a tire; a tire position control unit configured to relatively displace a tire as a target of measurement along an axis of rotation and a radial direction of the rotating drum; a tire drive unit configured to control a rotational velocity of the tire; a measurement unit side rotational position detection unit configured to detect a rotational position of the measurement unit; a tire side rotational position detection unit configured to detect a rotational position of the tire; and a measurement position identifying unit configured to identify a position, in a tire circumferential direction, of a measurement point by the measurement unit from the rotational position of the measurement unit detected by the measurement unit side rotational position detection unit and the rotational position of the tire detected by the tire side rotational position detection unit.

In the apparatus for measuring tire ground contact properties of the present invention, the measurement unit is preferably a three-component force sensor capable of measuring the ground contact pressure, the width direction shear stress, and the circumferential shear stress of the tire.

Advantageous Effect of Invention

According to the method for measuring tire ground contact properties of the present invention, when the measurement unit is contacted to a plurality of locations in the tire circumferential direction on the tread surface of the tire to measure the ground contact pressure, width direction shear stress, and circumferential shear stress of the tire at the locations, the position in the tire circumferential direction of each measurement point is identified. Therefore, the ground contact pressure, width direction shear stress, and circumferential shear stress at each position in the tire circumferential direction can be obtained, making it possible to obtain the ground contact pressure distribution, width direction shear stress distribution, and circumferential shear stress distribution in the ground contact region of the tire with the rotating drum in greater detail. For example, when the tire has a complicated tread pattern, it is possible to obtain the local ground contact properties of the tread pattern in detail.

According to the apparatus for measuring tire ground contact properties of the present invention, the above method for measuring tire ground contact properties of the present invention can easily be implemented, and the same effects as those of the above method for measuring tire ground contact properties of the present invention can be achieved.

In the method and apparatus for measuring tire ground contact properties of the present invention, when the measurement unit is a three-component force sensor capable of measuring the ground contact pressure, width direction shear stress, and circumferential shear stress of the tire, then the ground contact pressure, width direction shear stress, and circumferential shear stress at the same position on the tread surface of the tire can be measured simultaneously, allowing for rigorous assessment of the correlation between the ground contact pressure and stress. Furthermore, when the measurement unit is a three-component force sensor, a slip distribution in the tire ground contact region can be obtained from the results of measurement, allowing for identification of the site on the tread pattern at which local slip occurs. The slip occurrence site identified in this way can be utilized in designs that reduce tire wear or squealing.

BRIEF DESCRIPTION OF DRAWINGS

The present invention will be further described below with reference to the accompanying drawings, wherein.

DESCRIPTION OF EMBODIMENTS

The following describes an embodiment of the present invention in detail with reference to the drawings.

Figure 1:
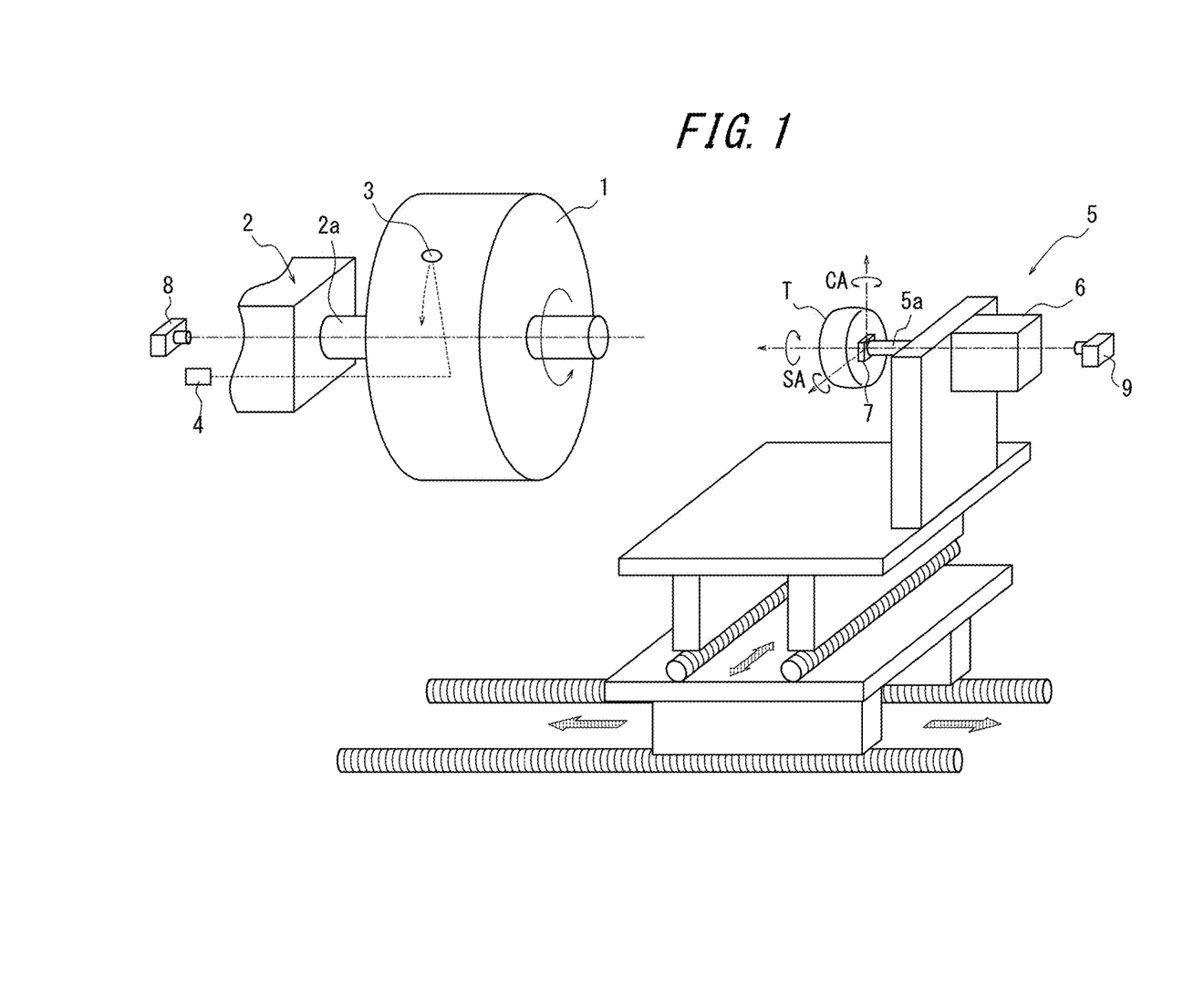
FIG. 1 is a perspective view illustrating an apparatus for measuring tire ground contact properties according to an embodiment of the present invention.

The apparatus for measuring tire ground contact properties according to an embodiment of the present invention as illustrated in FIG. 1 (also referred to as a measurement apparatus) is for measuring ground contact properties of a rolling tire T.

This measurement apparatus is provided with a cylindrical rotating drum 1. The rotating drum 1 is an outside drum type, such that the tire T abuts against the outer circumferential surface of the rotating drum 1, and is connected along the axis of rotation to a drum shaft 2a in a drum drive unit 2. The drum drive unit 2 is provided with a driving source (not illustrated), such as an electric motor, connected to the drum shaft 2a and can rotate the rotating drum 1 in both the forward and reverse directions. The drum drive unit 2 can also control the rotational velocity Vd of the rotating drum 1.

The rotating drum 1 is not limited to being an outside drum type. Alternatively, the rotating drum 1 may be an inside drum type with an annular shape such that the tire T abuts the inner circumferential surface.

As a measurement unit, a three-component force sensor 3 capable of measuring the ground contact pressure P, width direction shear stress $\tau_x$, and circumferential shear stress $\tau_y$ of the tire T is embedded in the rotating drum 1. The three-component force sensor 3 is provided on the outer circumferential surface of the rotating drum 1 and can contact the tire T that rolls along the outer circumferential surface of the rotating drum 1. When contacted by the tire T, the three-component force sensor 3 simultaneously measures the ground contact pressure P, width direction shear stress $\tau_x$, and circumferential shear stress $\tau_y$ of the tire T and outputs the results of measurement.

In the present embodiment, a small three-component force sensor 3 is used as the measurement unit, yet the measurement unit may be structured differently, such as by combining a sensor that measures only the ground contact pressure P with a two-axis sensor that measures the shear stress $\tau_x$ and the shear stress $\tau_y$.

The three-component force sensor 3 is connected to a processing device 4 into which the results of measurements are input. As the processing device 4, for example a microcomputer provided with a central processing unit (CPU), memory, and the like may be used. A data analysis program for analyzing the results of measurement is stored in the memory of the processing device 4. The general-purpose numerical analysis program MATLAB (Mathworks), for example, may be used as the data analysis program.

The processing device 4 processes the results of measurements input from the three-component force sensor 3, i.e. measurement data, and calculates the ground contact pressure distribution, width direction shear stress distribution, and circumferential shear stress distribution in the ground contact region between the tire T and the rotating drum 1. The processing device 4 can apply visualization processing to the resulting ground contact pressure distribution, width direction shear stress distribution, and circumferential shear stress distribution of the tire T for display on a monitor.

The processing device 4 is not limited to the above configuration, and as long as the results of measurements by the three-component force sensor 3 can be processed to obtain the ground contact properties of the tire T, a processing device provided with a different data analysis program, for example, may be used.

Reference numeral 5 indicates a tire control stand (tire position control unit). This tire control stand 5 includes a spindle 5a to which the tire T that is the target of measurement is attached. The tire control stand 5 can displace the tire T attached to the spindle 5a along the axis of rotation of the rotating drum 1 and the radial direction of the rotating drum 1.

In the present embodiment, the tire T is displaced with respect to the rotating drum 1 using the tire control stand 5, yet this example is not limiting. Alternatively, the rotating drum 1 may be displaced with respect to the tire T.

A tire drive unit 6 is attached to the tire control stand 5. The tire drive unit 6 is provided with a driving source (not illustrated), such as an electric motor, connected to the spindle 5a and can rotate the tire T via the spindle 5a in both the forward and reverse directions. The tire drive unit 6 can also control the rotational velocity Vt of the tire T.

Figure 2:
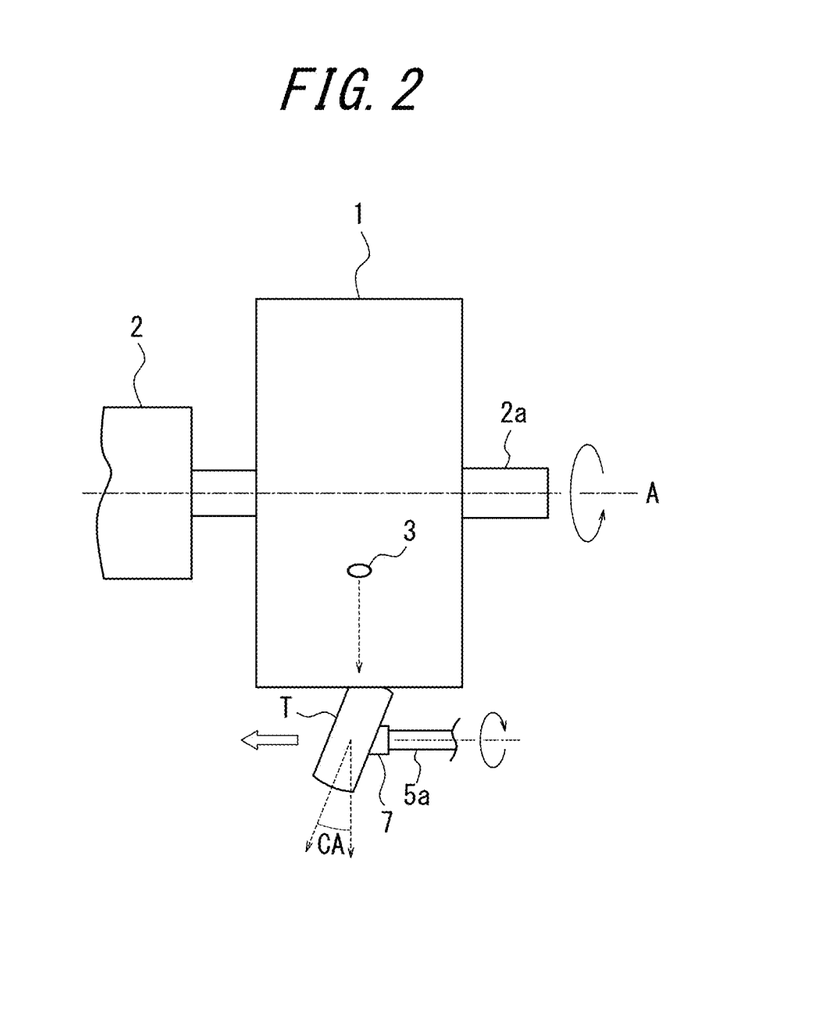
FIG. 2 is a plan view of a tire, with a camber angle applied thereto, contacted against a rotating drum.

A tire angle control unit 7 is provided at the tip of the spindle 5a. At the time of measurement, the tire angle control unit 7 can apply a camber angle CA to the tire T as necessary, as illustrated in FIG. 2. The tire angle control unit 7 can also apply a slip angle SA to the tire T and can apply both the camber angle CA and the slip angle SA. Furthermore, in the tire angle control unit 7 of the present embodiment, the ground contact force, i.e. the load, on the tire T abutting the rotating drum 1 can be adjusted. The tire angle control unit 7 thus allows for adjustment of the camber angle CA, the slip angle SA, the ground contact force, and the like of the tire T to reproduce the tire conditions upon cornering or the like and obtain the corresponding ground contact properties.

Either or both of the camber angle CA and slip angle SA applied to the tire T may be set to 0°. When both the camber angle CA and the slip angle SA applied to the tire T are set to 0°, the ground contact properties when the vehicle is traveling straight are measured by the processing device 4.

At the time of measurement, the drum shaft 2a of the rotating drum 1 and the spindle 5a of the tire T are preferably disposed at equivalent heights. In this way, in particular the camber angle CA and slip angle SA of the tire T can be reflected on the ground contact surface more accurately, hence improving the measurement accuracy.

Figure 3:
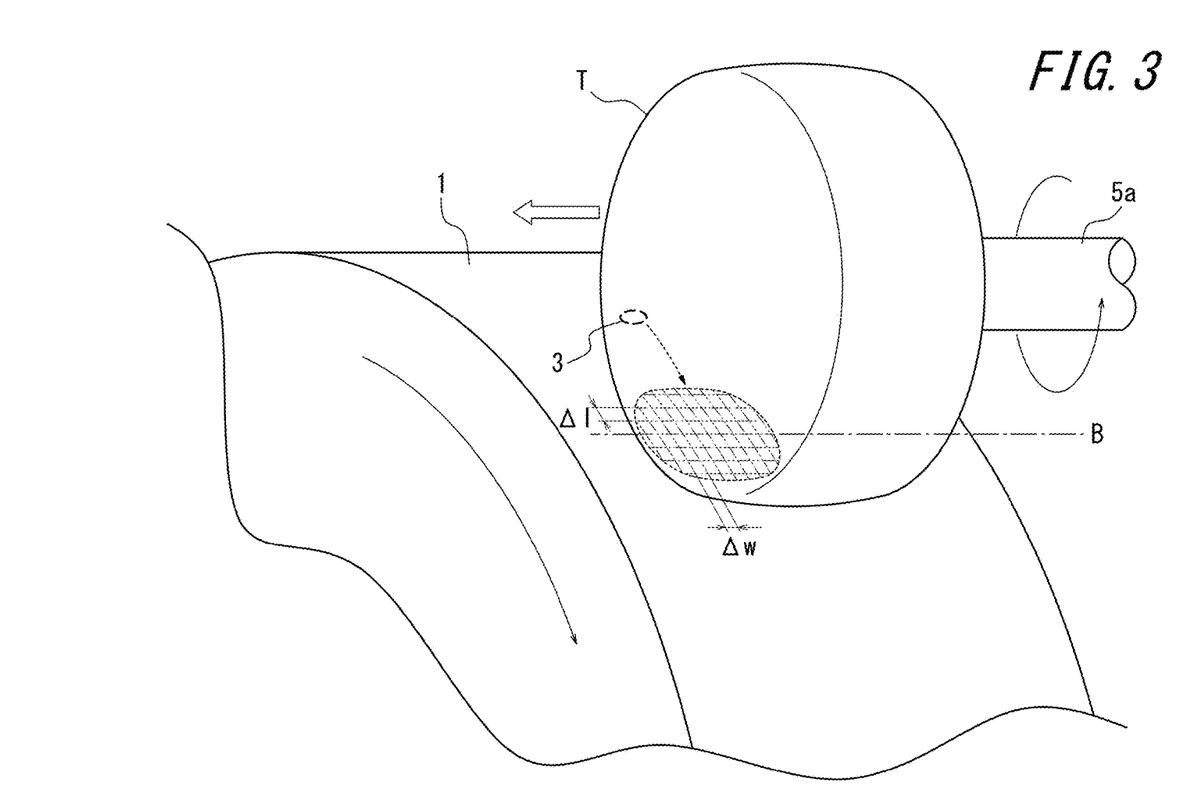
FIG. 3 illustrates measurement resolution in the tire width direction and circumferential direction of a three-component force sensor in the ground contact region between the rotating drum and the tire.

A rotary encoder 8 is mounted on the drum shaft 2a as the measurement unit side rotational position detection unit. This rotary encoder 8 can detect the rotational position of the three-component force sensor 3 (measurement unit) embedded in the rotating drum 1. In the present embodiment, as illustrated in FIG. 3, the position directly below the load, where the rotating drum 1 and the tire T are in contact, is designated as a reference position B. The rotary encoder 8 detects the rotational position of the three-component force sensor 3 as an angle of rotation with reference to the reference position B.

A rotary encoder 9 is mounted on the spindle 5a as the rotational position detection unit on the tire side. The rotary encoder 9 can detect the rotational position of the tire T. In the present embodiment, a measurement range having a predetermined angle range in the circumferential direction is set on the tread surface (outer circumferential surface) of the tire T as the target of measurement for the ground contact properties of the tire T. The rotary encoder 9 detects the rotational position of the tire T, i.e. the measurement range, as an angle of rotation with reference to the reference position B.

Each of the rotary encoders 8 and 9 is connected to the above-described processing device 4. Detected data on the rotational position of the three-component force sensor 3 detected by the rotary encoder 8 and detected data on the rotational position of the tire T detected by the rotary encoder 9 are input into the processing device 4. At the time of measurement, the processing device 4 processes the detected data input from the rotary encoders 8 and 9 and identifies the position, in the circumferential direction, on the tire T contacted by the three-component force sensor 3, i.e. the position, in the tire circumferential direction, of the measurement point of the three-component force sensor 3.

In this way, in the present embodiment, the processing device 4 has the function of processing data from the three-component force sensor 3 and the function of the measurement position identifying unit that identifies the position, in the tire circumferential direction, of the measurement point of the three-component force sensor 3.

In the present embodiment, when the three-component force sensor 3 is detected to be at the reference position B by the rotary encoder 8 and the measurement range set for the tire T is detected to be at the reference position B by the rotary encoder 9, then the processing device 4 performs measurement with the three-component force sensor 3 and identifies the position, in the tire circumferential direction, of the measurement point. Accordingly, measurement of ground contact properties is performed automatically only when the three-component force sensor 3 is in contact with the measurement range of the tire T, and measurement is not performed when the three-component force sensor 3 contacts a range outside the measurement range of the tire T. Hence, the recording of data unnecessary for measurement of the ground contact properties of the tire T can be prevented, thus reducing the load on the processing device 4.

The measurement range that is set for the tire T is not limited to one location on the tread surface of the tire T. When a plurality of regions at which the tread pattern is identical is provided at positions separated in the circumferential direction on the tread surface of the tire T, these regions may each be set as a measurement range. When a plurality of measurement ranges is set for the tread surface of the tire T, the probability of the three-component force sensor 3 contacting a measurement range increases, allowing for a decrease in the measurement time. In turn, this decrease in measurement time can suppress wear of the tire T and heat generation and can improve measurement accuracy.

The method for measuring tire ground contact properties according to the present invention may, for example, be implemented using a measurement apparatus such as the one described above. The following describes the steps for measuring ground contact properties of a rolling tire T with the method for measuring tire ground contact properties according to the present invention, using the above measurement apparatus.

The tire T that is the target of measurement is attached to the spindle 5a of the tire control stand 5. As illustrated in FIG. 3, the tire control stand 5 is then operated to cause the tire T to abut the outer circumferential surface of the rotating drum 1 in which is embedded the three-component force sensor 3 capable of measuring the ground contact pressure P, width direction shear stress $\tau_x$, and circumferential shear stress $\tau_y$ of the tire T.

When, for example, measuring the ground contact properties of the tire T when the vehicle corners, the tire angle control unit 7 can, as necessary, apply a required camber angle CA and/or slip angle SA to the tire T. When, for example, measuring the ground contact properties of the tire T when the vehicle is traveling straight, the camber angle CA and/or slip angle SA of the tire T can be set to 0°. Furthermore, the ground contact force, i.e. the load, of the tire T on the rotating drum 1 can be adjusted with the tire angle control unit 7.

Next, the rotating drum 1 is rotated with the drum drive unit 2 and the tire T is rotated with the tire drive unit 6 to roll the tire T on the outer circumferential surface of the rotating drum 1 at a preset rotational velocity. The rotational velocity of the tire T may, for example, be set in a range of 10 km/h to 400 km/h in terms of vehicle speed, yet measurement is preferably performed at a rotational velocity of approximately 100 km/h.

The rotating drum 1 and the tire T may be caused to abut each other while both are rotating.

Upon the tire T and the rotating drum 1 rotating, the rolling tire T passes over the three-component force sensor 3, and the three-component force sensor 3 contacts a plurality of locations in the tire circumferential direction on the tread surface of the tire T. The ground contact pressure P, width direction shear stress $\tau_x$, and circumferential shear stress $\tau_y$ at the plurality of locations on the tread surface of the rolling tire T are measured by the three-component force sensor 3. During each of these measurements, the three-component force at the same position on the surface of the tire T can be measured simultaneously using the three-component force sensor 3. Measurement is performed until the three-component force sensor 3 contacts a plurality of locations, in the circumferential direction, in the measurement range of the tire T and the total number of measurements at the locations reaches a predetermined number (such as 50).

Along with the measurement of the ground contact pressure P, width direction shear stress $\tau_x$, and circumferential shear stress $\tau_y$ of the tire T by the three-component force sensor 3, the position, in the tire circumferential direction, of each measurement point is identified by the processing device 4. The identification of the position, in the tire circumferential direction, of each measurement point is made based on the rotational position of the three-component force sensor 3, as detected by the rotary encoder 8, and the rotational position of the tire T, as detected by the rotary encoder 9. In other words, the position, in the tire circumferential direction, of each measurement point is identified based on the rotational position of the tire T when the three-component force sensor 3 is at the reference position.

As illustrated in FIG. 3, the resolution Δl of the rotary encoders 8 and 9 in the circumferential direction is preferably set to be from ⅓ mm to 1 mm during identification of the position, in the tire circumferential direction, of the measurement point. When the resolution Δl is set to ⅓ mm, a plurality of grid points aligned in the circumferential direction at ⅓ mm intervals is set in the measurement range of the tire T, and contact by the three-component force sensor 3 is distinguished for each grid point.

After measurement by the three-component force sensor 3 is made a plurality of times to obtain results of measurement at least a predetermined number of times in the measurement range at a position in the width direction of the tire T, the tire control stand 5 automatically operates to displace the tire T by a predetermined displacement amount Δw along the axis of rotation, i.e. the width direction of the tire T. Then, at the position in the width direction after displacement, the ground contact pressure P, width direction shear stress $\tau_x$, and circumferential shear stress $\tau_y$ of the tire T are measured by the three-component force sensor 3, and the position, in the tire circumferential direction, of each measurement point is identified. Measurement and displacement in the width direction are thus repeated automatically to measure the entire width of ground contact for the tire T. The results of multiple measurements by the three-component force sensor 3 are associated with respective positions in the tire circumferential direction and positions in the tire width direction and stored in the processing device 4. Note that the measurement data obtained for each position in the width direction are identified in the processing device 4 as measurement data obtained for that position in the width direction.

In this way, measurement of the ground contact pressure P, width direction shear stress $\tau_x$, and circumferential shear stress $\tau_y$ of the tire T and identification of the position, in the circumferential direction of the tire T, of each measurement point are repeated while the tire control stand 5 displaces the measurement position by a predetermined displacement amount Δw along the axis of rotation of the rotating drum 1.

In consideration of a balance between the measurement resolution and efficiency, the displacement amount Δw of the tire T along the axis of rotation is preferably set in a range from 1 mm to 4 mm.

Once the ground contact pressure P, width direction shear stress $\tau_x$, and circumferential shear stress $\tau_y$ are measured at each position in the width direction in the contact region of the tire T with the rotating drum 1, the results of measurement are processed (analyzed) by the processing device 4 to obtain a ground contact pressure distribution, width direction shear stress distribution, and circumferential shear stress distribution of the tire T in the ground contact region. The results of multiple measurements processed by the processing device 4 are each associated with a position in the tire circumferential direction and a position in the tire width direction. Therefore, the ground contact pressure distribution, width direction shear stress distribution, and circumferential shear stress distribution obtained by processing these results of measurement all represent the ground contact properties at each location in the ground contact region of the tire T in detail. The ground contact pressure distribution, width direction shear stress distribution, and circumferential direction shear stress distribution of the tire T obtained in this way are, for example, subjected to visualization by the processing device 4 and displayed on a monitor.

When, at the time of measurement, results of a plurality of measurements at the same position on the tire T are obtained by the three-component force sensor 3 contacting the same position in the ground contact region of the tire T, the average of these results of a plurality of measurements are used as the results of measurement. The results of measurement can thus be stabilized.

In this way, the method and apparatus for measuring tire ground contact properties of the present invention obtain results of multiple measurements by the three-component force sensor 3 randomly contacting the tread surface of the tire T and identify the position, in the circumferential direction on the tread surface of the tire T, at which the results of each of the measurements were obtained. Hence, the ground contact pressure distribution, width direction shear stress distribution, and circumferential shear stress distribution in the ground contact region of the tire T with the rotating drum 1 can be obtained in greater detail. For example, even when the tire T has a complicated tread pattern, it is possible to obtain the local ground contact properties at each location of the tread pattern in detail.

Since ground contact properties are measured by contacting the tire T against the rotating drum 1 in which the three-component force sensor 3 is embedded, the ground contact properties, when driving at high speed, at each location on the tread pattern of the tire T can be obtained in detail by setting the rotational velocity of the rotating drum 1 and the tire T to a high speed.

Furthermore, by providing the tire angle control unit 7, a required camber angle CA and/or slip angle SA can be applied to the tire T, making it possible to reproduce the tire conditions upon vehicle cornering or the like and obtain the corresponding ground contact properties.

Additionally, correlating the results of measurement by the three-component force sensor 3 allows for calculation of the coefficient of friction μ or the like at any location in the ground contact region of the tire T to obtain a distribution of the coefficient of friction μ of the tire T within the ground contact region, i.e. a slip distribution. Based on this slip distribution, the site on the tread pattern at which local slip occurs can be identified and utilized in designs that reduce wear or squealing of the tire T.

The coefficient of friction μ can be calculated with Equation 1 from the ground contact pressure P, width direction shear stress $\tau_x$, and circumferential shear stress $\tau_y$.

$$\mu = (\tau_x^2 + \tau_y^2)^{1/2}/P \qquad \text{Equation 1}$$

Figure 4A:
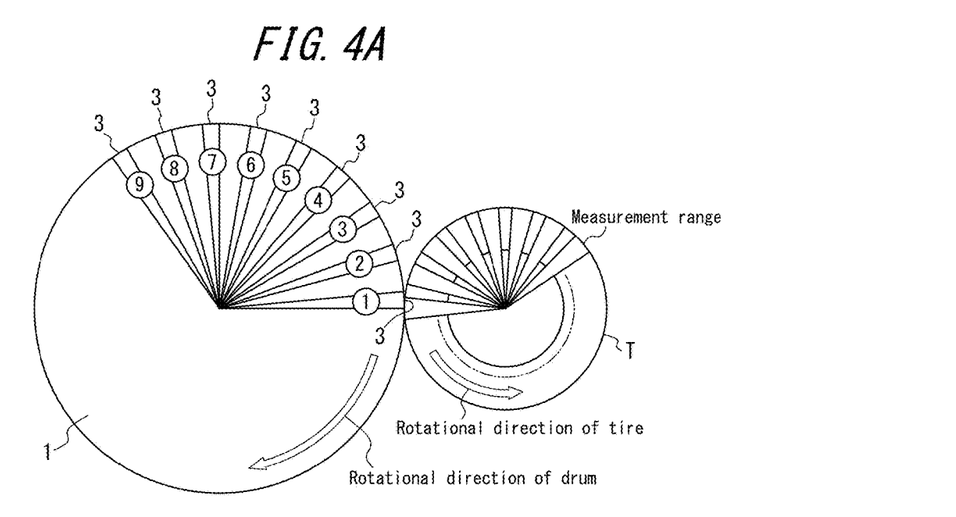
FIG. 4(a) schematically illustrates a modification to the measurement apparatus of the present invention.
Figure 4B:
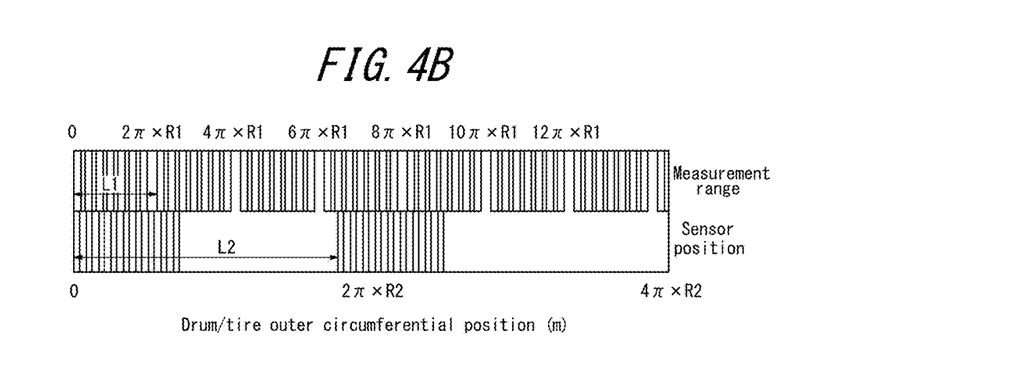
FIG. 4(b) illustrates temporal synchronization between the three-component force sensor embedded in the rotating drum and the measurement range of the tire T during measurement using the measurement apparatus illustrated in FIG. 4(a)

FIG. 4(a) schematically illustrates a modification to the measurement apparatus of the present invention, and FIG. 4(b) illustrates temporal synchronization between the three-component force sensor embedded in the rotating drum and the measurement range of the tire T during measurement using the measurement apparatus illustrated in FIG. 4(a). In FIG. 4(b), L1 represents the outer peripheral length of the tire T, R1 represents the radius of the tire T, L2 represents the outer peripheral length of the rotating drum 1, and R2 represents the radius of the rotating drum 1.

In the method for measuring tire ground contact properties of the present invention, the ground contact properties of the tire T for which a plurality of measurement ranges are set on the tread surface can be measured by the following method using the measurement apparatus of a modification to the present invention in which, as illustrated in FIG. 4(a), a plurality of three-component force sensor 3 is provided at equal intervals in the circumferential direction on the surface of the rotating drum 1.

In this case, for example nine of the three-component force sensor 3 are provided at equal intervals in the circumferential direction in only a partial range in the circumferential direction on the surface of the rotating drum 1 (in the illustrated example, a range of approximately ⅓ of the entire circumference). No three-component force sensor 3 is provided in the remaining range of the circumferential surface of the rotating drum 1. On the other hand, on the tread surface of the tire T, a plurality of measurement ranges are set in the circumferential direction over nearly the entire range in the circumferential direction of the tire T. The radius of the rotating drum 1 is approximately three times larger than the radius of the tire T.

In the measurement method of the present invention using this measurement apparatus, when rotating the rotating drum 1 and the tire T, the tire T rotates approximately three times during one rotation of the rotating drum 1, as illustrated in FIG. 4(b). During rotation, when the position of the measurement range of the tire T as shown in the upper tier of FIG. 4(b) and the position of the three-component force sensor 3 as shown in the lower tier of FIG. 4(b) match, the three-component force sensor 3 measures the ground contact properties in the measurement range of the tire T.

In this modification, measurement by the three-component force sensor 3 is performed in a partial range of the entire circumference of the rotating drum 1, i.e. in a range of approximately ⅓ of the entire circumference. Therefore, measurement by the three-component force sensor 3 is performed during a portion, i.e. approximately ⅓, of the time for one rotation of the rotating drum 1. During the other approximately ⅔ of the time, measurement by the three-component force sensor 3 of the ground contact properties of the tire T is not performed, even though the measurement range of the tire T is in contact with the outer circumference of the rotating drum 1. In the present modification, this gap in time in which measurement is not performed is used to simultaneously reset all nine of the three-component force sensor 3 that have measured the ground contact properties of the tire T. In other words, each three-component force sensor 3 that has performed measurement once needs to be reset in order to achieve a state allowing for another measurement. In the present modification, a plurality of three-component force sensor 3 are arranged in a partial range of the entire circumference of the rotating drum 1, so that among the time for one rotation of the rotating drum 1, the time during which the three-component force sensor 3 are in contact with the measurement range of the tire T is used for measurement, whereas the remaining time during which the three-component force sensor 3 are not in contact with the measurement range of the tire T is used to initialize the three-component force sensor 3 simultaneously. In this way, during one rotation of the rotating drum 1, the time necessary for initializing a three-component force sensor 3 that has measured the tire T once can be guaranteed easily, facilitating initialization of the three-component force sensor 3 during high-speed rotation of the rotating drum 1 or the tire T. Furthermore, the time for simultaneously initializing a plurality of three-component force sensor 3 can be guaranteed. Hence, the measurement apparatus can be simplified without using a complicated structure for individually initializing a plurality of three-component force sensor 3.

A structure that can individually initialize each three-component force sensor 3 may also be adopted. In this case, a plurality of three-component force sensor 3 may be provided along the entire circumference of the rotating drum 1, and the three-component force sensor 3 may be initialized individually in the order in which measurement was performed.

EXAMPLES

Figure 5:
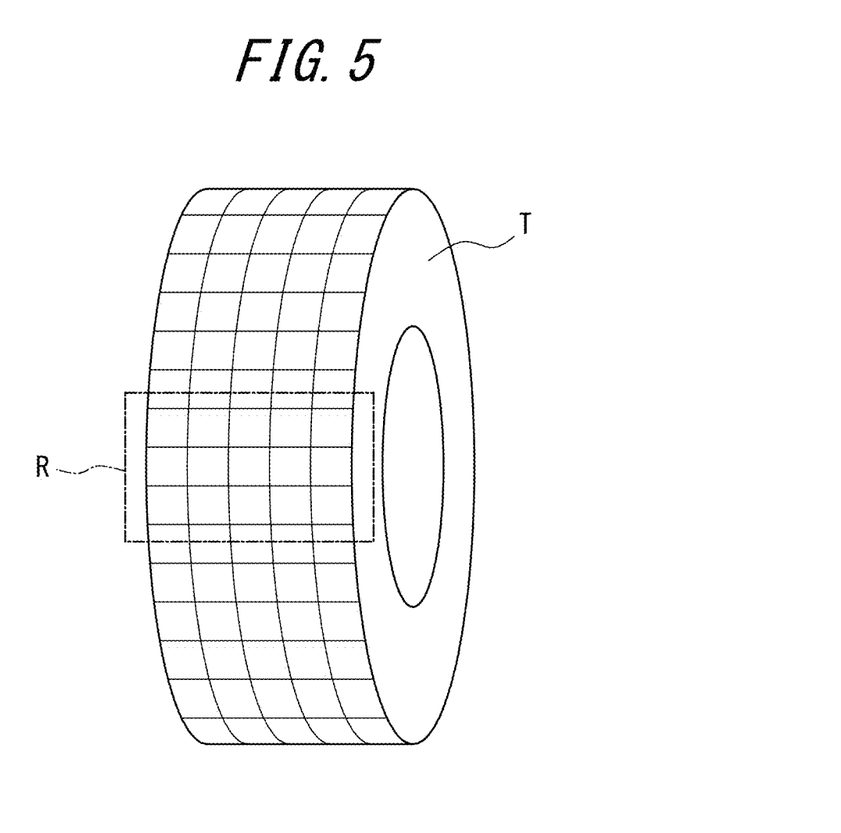
FIG. 5 schematically illustrates a tire used in an example according to the present invention.

For a measurement test, a tire T with a tire size of 205/55R16 and approximately rectangular caramel blocks on the tread surface, as schematically illustrated in FIG. 5, was produced. A measurement range R was set in a predetermined range of the tread surface, and in accordance with FIG. 1, the tire T was attached to the spindle 5a of the tire control stand 5. The ground contact pressure P, width direction shear stress $\tau_x$, and circumferential shear stress $\tau_y$ of the tire T were measured under the conditions of a slip angle SA of 0° and a camber angle CA of 0° for the tire T, a rotational velocity Vt of the tire T of 100 km/h, a rotational velocity Vd of the rotating drum 1 of 100 km/h, a displacement amount Δw of 2 mm in the tire width direction, and a resolution Δl of ⅓ mm in the circumferential direction.

Figure 6:
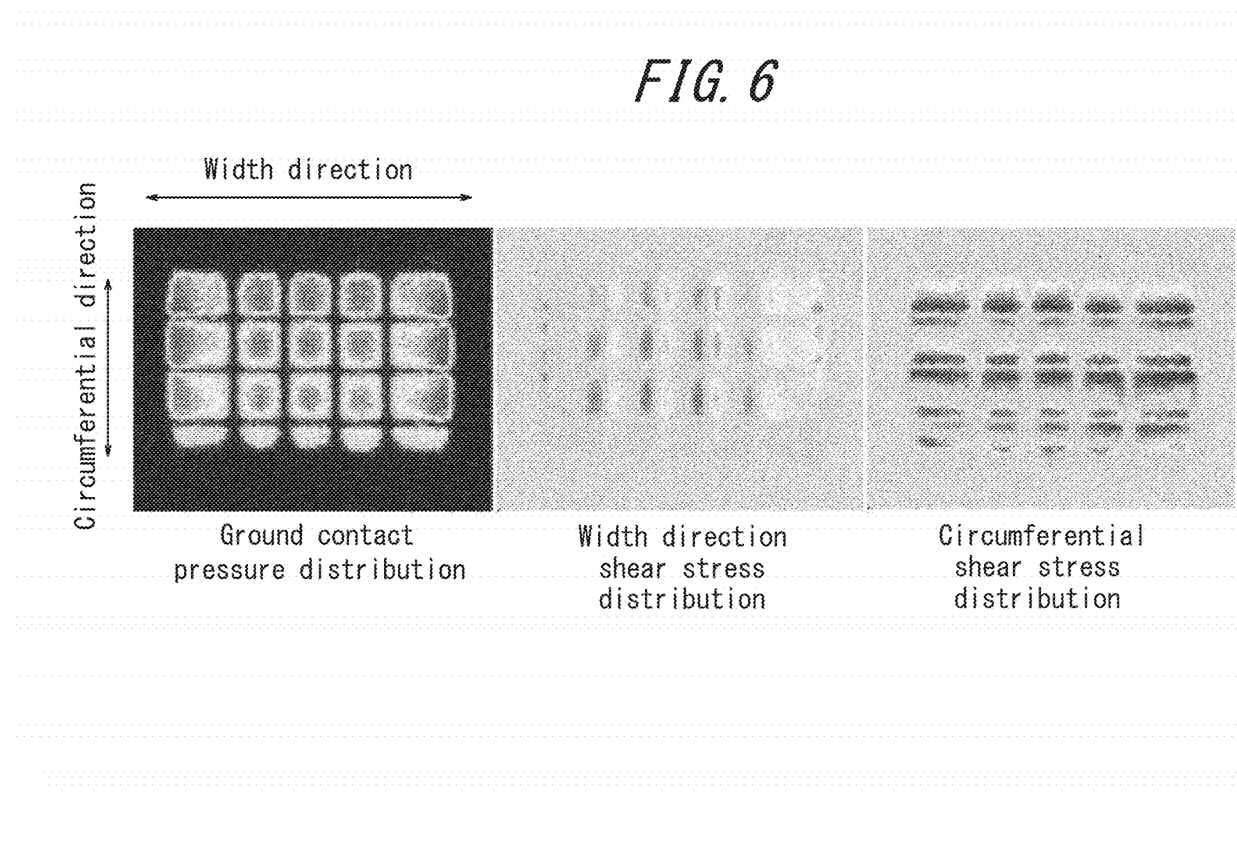
FIG. 6 is a visualization of tire ground contact properties obtained with an example according to the present invention for a slip angle of 0°.

Calculating the ground contact pressure distribution, width direction shear stress distribution, and circumferential shear stress distribution of the tire T based on the data obtained by measurement yielded the detailed distributions of the ground contact properties at each location of the tread pattern as illustrated in FIG. 6.

Figure 7:
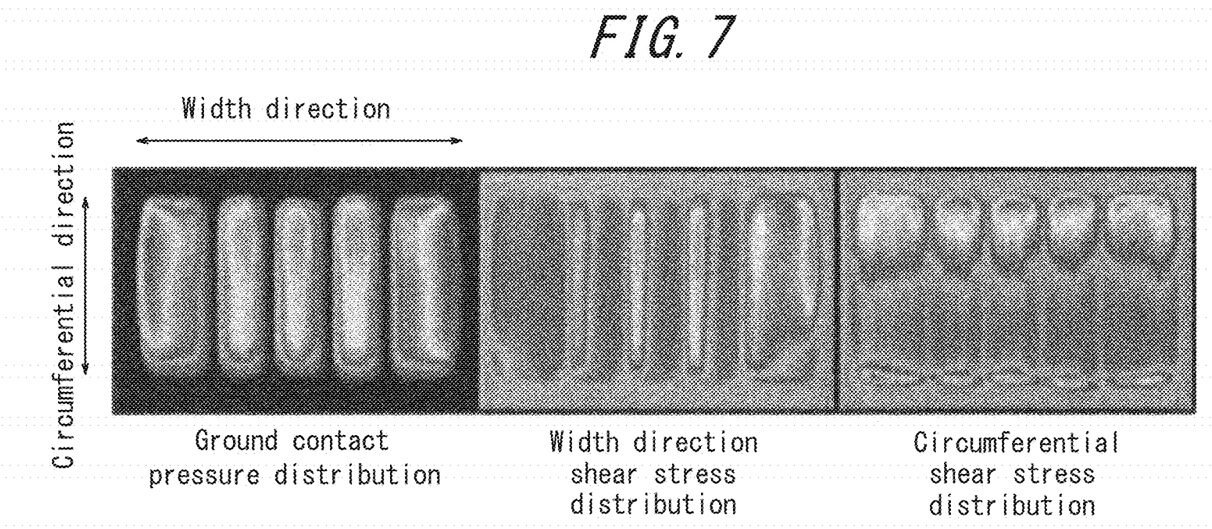
FIG. 7 is a visualization, as a comparative example for the present invention, of tire ground contact properties obtained when averaging the results of measurements by a three-component force sensor in the tire circumferential direction.

Conversely, without identifying the positions, in the tire circumferential direction, of the measurement points of the three-component force sensor 3, the results of multiple measurements by the three-component force sensor 3 were averaged in the tire circumferential direction to obtain the ground contact properties of the tire T in a comparative example. As illustrated in FIG. 7, the ground contact properties of the tire T are averaged in the circumferential direction in the comparative example, and the ground contact properties at each location on the tread pattern of the tire T cannot be ascertained.

Figure 8:
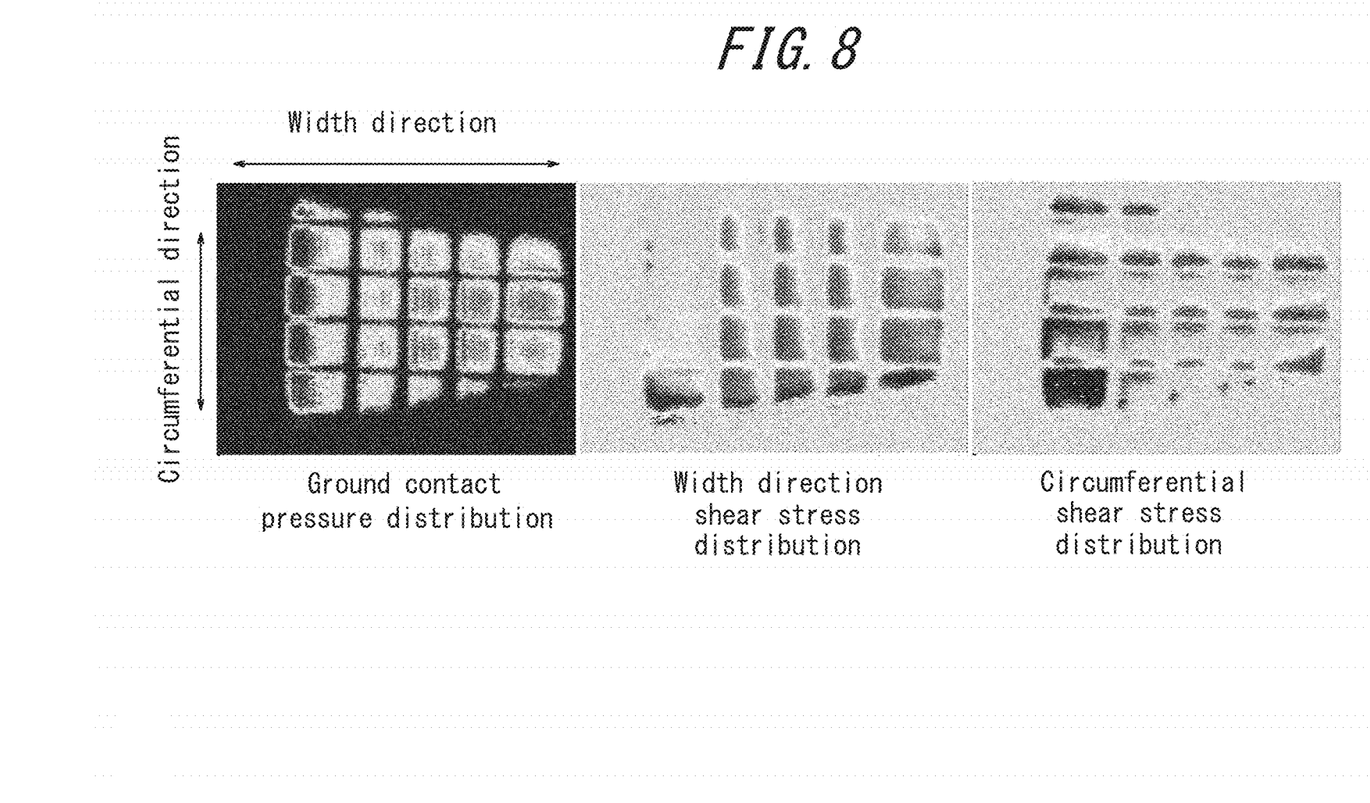
FIG. 8 is a visualization of tire ground contact properties obtained with an example according to the present invention for a slip angle of 3°.

Calculating the ground contact pressure distribution, width direction shear stress distribution, and circumferential shear stress distribution of the tire T when setting the slip angle SA of the tire T to 3° and otherwise using the same conditions as above yielded the detailed distributions of the ground contact properties at each location on the tread pattern of the tire T during vehicle cornering, as illustrated in FIG. 8.

The present invention is not limited to the above embodiment, and a variety of modifications are possible within a range not departing from the scope of the present invention.

For example, in the above embodiment, one measurement unit (three-component force sensor 3) is embedded in the rotating drum 1, yet any number of measurement units may be used as necessary. For example, a plurality of measurement units may be arranged along the axis of rotation or the circumferential direction of the rotating drum 1.

During measurement, the rotational velocity Vt of the tire T and the rotational velocity Vd of the rotating drum 1 need not be set to the same speed. Rather, the rotational velocity Vt of the tire T and the rotational velocity Vd of the rotating drum 1 may differ. For example, when Vt<Vd, ground contact conditions of the tire T during vehicle braking can be reproduced, whereas when Vt>Vd, the ground contact conditions of the tire T during vehicle acceleration can be reproduced. When Vt=Vd, the ground contact conditions of the tire T when the vehicle is running at a constant speed can be reproduced. Furthermore, by driving only the drum drive unit 2 and letting the tire drive unit 6 idle, the ground contact conditions when the tire T rolls freely can be measured.

REFERENCE SIGNS LIST

1: Rotating drum
2: Drum drive unit
2a: Drum shaft
3: Three-component force sensor
4: Processing device (measurement position identifying unit)
5: Tire control stand (tire position control unit)
5a: Spindle
6: Tire drive unit
7: Tire angle control unit
8: Rotary encoder (measurement unit side rotational position detection unit)
9: Rotary encoder (tire side rotational position detection unit)
T: Tire
B: Reference position
Vd: Rotational velocity of drum
P: Ground contact pressure
$\tau_x$: Width direction shear stress
$\tau_y$: Circumferential shear stress
Vt: Rotational velocity of tire
CA: Camber angle
SA: Slip angle
Δl: Resolution
Δw: Displacement amount
R: Measurement range

The invention claimed is:

1. A method for measuring ground contact properties of a rolling tire, comprising the steps of:
   rotating a rotating drum, which is capable of being rotatably driven, and a tire together, the rotating drum having embedded therein a measurement unit capable of measuring ground contact pressure, width direction shear stress, and circumferential shear stress of the tire, the tire being contacted against the rotating drum as a target of measurement;
   contacting the measurement unit to a plurality of locations in the tire circumferential direction on a tread surface of the tire, the locations passing over the measurement unit;
   measuring the ground contact pressure, the width direction shear stress, and the circumferential shear stress of the tire at the locations;
   detecting a rotational position of the measurement unit by a measurement unit side rotational position detection unit;
   detecting a rotational position of the tire by a tire side rotational position detection unit;
   identifying a position in the tire circumferential direction of each measured location based on the rotational position of the measurement unit detected by the measurement unit side rotational position detection unit and the rotational position of the tire detected by the tire side rotational position detection unit; and
   obtaining a ground contact pressure distribution, a width direction shear stress distribution, and a circumferential shear stress distribution in a contact region of the tire with the rotating drum by repeating the steps of the measuring the ground contact pressure, the width direction shear stress, and the circumferential shear stress and the identifying the position while relatively displacing the tire along an axis of rotation of the rotating drum.

2. The method according to claim 1, wherein the measurement unit is a three-component force sensor capable of measuring the ground contact pressure, the width direction shear stress, and the circumferential shear stress of the tire.

3. An apparatus for measuring ground contact properties of a rolling tire, comprising:
   a drum drive unit configured to control a rotating drum and a rotational velocity of the rotating drum, the rotating drum having embedded therein a measurement unit capable of measuring ground contact pressure, width direction shear stress, and circumferential shear stress of a tire;

a tire position control unit configured to relatively displace a tire as a target of measurement along an axis of rotation and a radial direction of the rotating drum;

a tire drive unit configured to control a rotational velocity of the tire;

a measurement unit side rotational position detection unit configured to detect a rotational position of the measurement unit;

a tire side rotational position detection unit configured to detect a rotational position of the tire; and a measurement position identifying unit configured to identify a position, in the tire circumferential direction, of a measurement point based on the rotational position of the measurement unit detected by the measurement unit side rotational position detection unit and the rotational position of the tire detected by the tire side rotational position detection unit.

4. The apparatus according to claim 3, wherein the measurement unit is a three-component force sensor capable of measuring the ground contact pressure, the width direction shear stress, and the circumferential shear stress of the tire.

* * * * *